June 1, 1937. E. T. PARSONS ET AL 2,082,753
PADDED COMPRESSION PLATE FOR DOUGH MOLDING MACHINES
Filed June 1, 1936 2 Sheets-Sheet 1
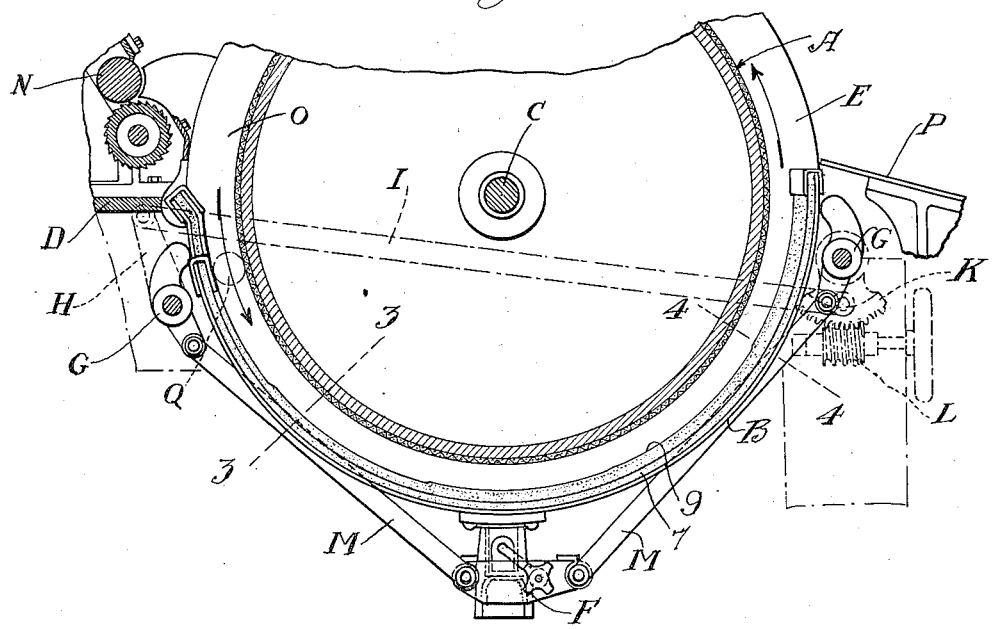
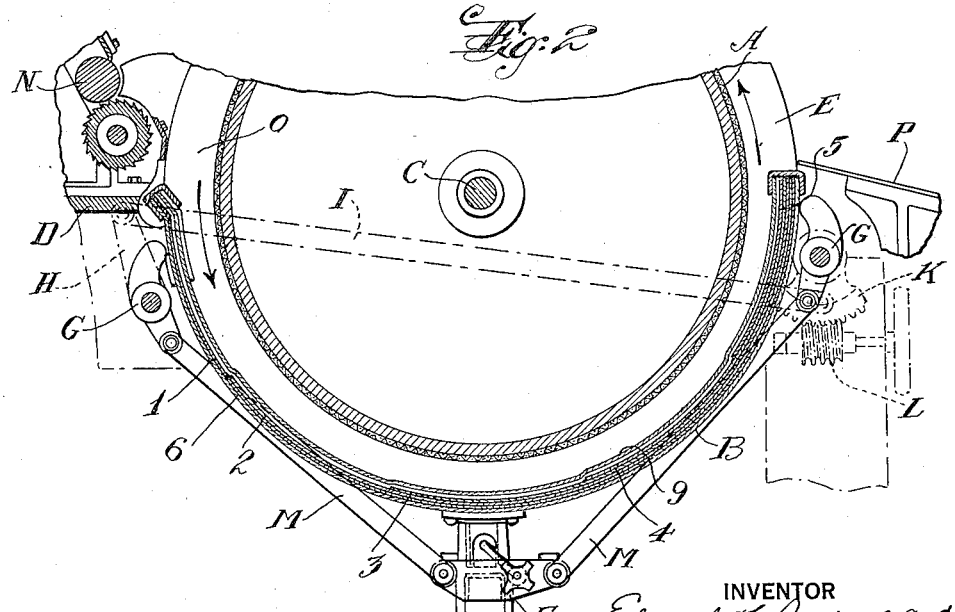
INVENTOR
Edward T. Parsons and
Lieon Willard Sawyer,
BY Harry B. Cook,
ATTORNEY

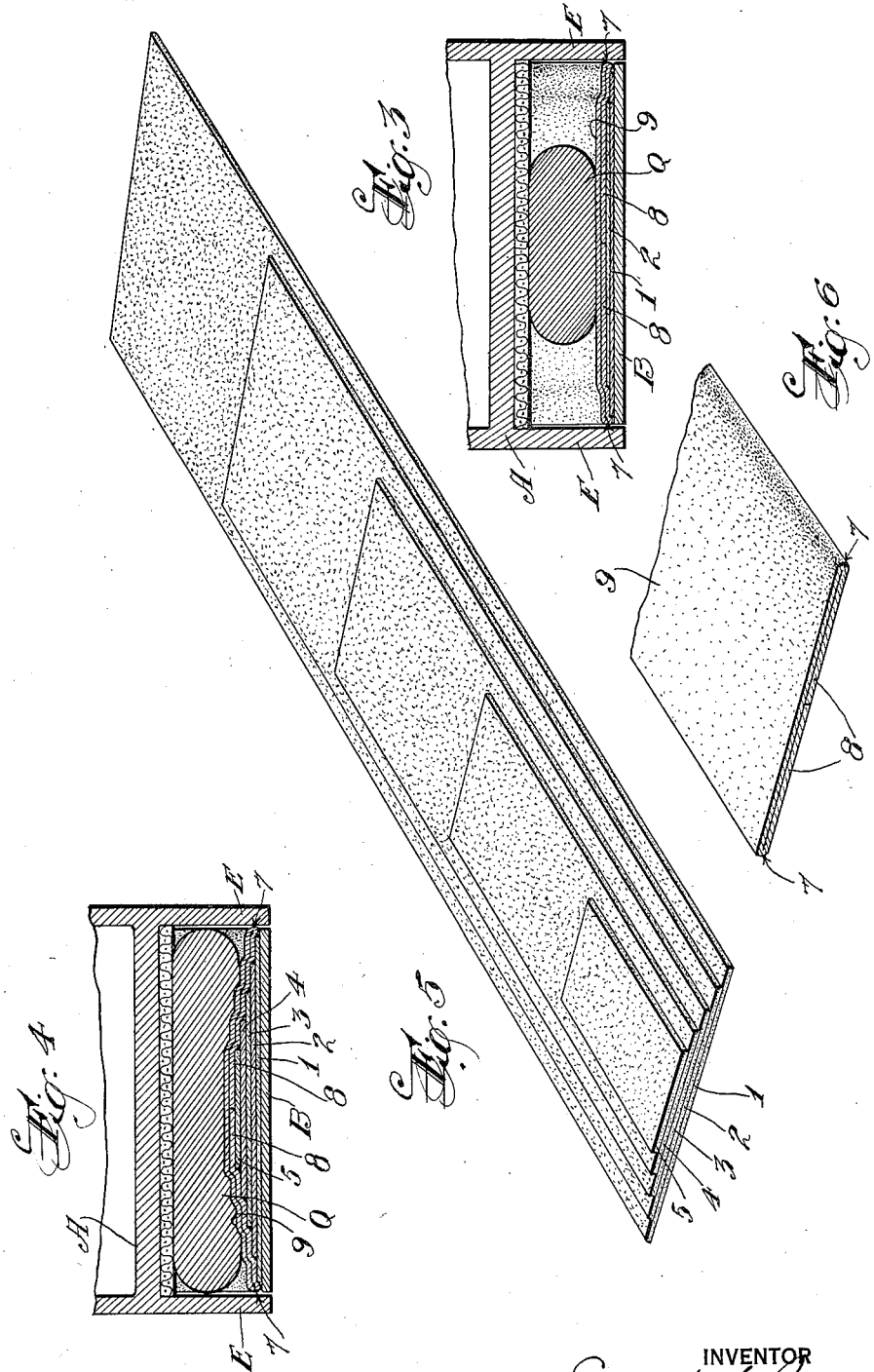

Patented June 1, 1937

2,082,753

UNITED STATES PATENT OFFICE 2,082,753

PADDED COMPRESSION PLATE FOR DOUGH MOLDING MACHINES

Edward T. Parsons, Upper Montclair, and Hilon Willard Sawyer, Nutley, N. J., assignors to Thomson Machine Company, Belleville, N. J., a corporation of New Jersey Application June 1, 1936, Serial No. 82,904

13 Claims. (Cl. 107—9)

This invention relates in general to dough working machines, and more particularly to machines wherein a roll of dough is molded or kneaded into a loaf between two relatively moving surfaces, for example, a rotating drum and an arcuate compression plate disposed in spaced relation to the periphery of the drum. This invention is especially intended for use with dough molding machines of the character disclosed in United States Patent No. 701,646.

In such dough molding machines, a sheet of dough is spirally coiled into a substantially cylindrical roll and then rolled and kneaded between a rotating drum and an arcuate compression plate, so that the roll is reduced in diameter and simultaneously elongated. According to present practice, the opposed surfaces of the drum and the compression plate are approximately flat, and the elongation of the rolled dough under pressure between the drum and the compression plate has a tendency to break or tear the "skin" on the roll at the ends thereof, which in some cases is objectionable. Moreover, the gases in the dough are not always as uniformly distributed as is desirable.

Therefore one object of our invention is to provide a novel and improved combination of two molding elements, e. g., a molding drum and a compression plate, to form a molding chamber between them to receive and roll a piece of dough, whereby the elongation of the piece between the molding surfaces shall be facilitated and effected in such manner as to prevent rupture or tearing of the skin at the ends of the piece and so as to uniformly distribute the gases in the dough piece.

Another object is to provide a compression plate which shall have a novel and improved dough molding surface so constructed and arranged with respect to the opposed molding surface, for example a drum, that the roll of dough shall be gradually pushed or squeezed from the longitudinal center of the roll toward the ends thereof and simultaneously and gradually the diameter of the roll shall be reduced, as the roll passes from the one end to the other of the molding chamber or the compression plate, whereby smooth and unbroken surfaces on the roll shall be insured and the dough shall be effectually kneaded or worked to uniformly distribute the gases throughout the loaf.

Other advantages, objects and results of the invention will appear from the following description when considered in conjunction with the accompanying drawings in which Figure 1 is an edge elevation view of a compression plate embodying the invention schematically illustrated in combination with a molding drum.

Figure 2 is a longitudinal sectional view through the compression plate.

Figures 3 and 4 are fragmentary enlarged transverse sectional views through the compression plate and molding drum on the lines 3—3 and 4—4 respectively of Figure 1.

Figure 5 is a detached perspective view of the padding for the compression plate and Figure 6 is a fragmentary sectional perspective view of the cover for the padding on the compression plate.

Specifically describing the illustrated embodiment of the invention, the reference character A designates a molding drum of a dough molding machine of the general character shown in Patent No. 701,646 and B represents the arcuate compression plate embodying the invention which cooperates with the drum in molding a roll of dough. As shown, the drum has a shaft C which is journaled on a frame D, and the compression plate B is adjustably supported on the frame D to be moved toward and from the drum. The compression plate is disposed between the end flanges E of the drum and adjustably supported on the frame D for movement toward and from the periphery of the drum, by a stirrup F and bell cranks G, the bell cranks and stirrup being actuated through a crank arm H connected to one of the bell cranks and a gear segment K connected to the other bell crank and operated by a worm L. Synchronous operation of the bell cranks is caused by connection of the gear segment K and crank H by a link I, and simultaneously operation of the bell cranks and stirrup F is produced by links M connecting the stirrup to the respective bell cranks. This supporting and operating mechanism for the compression plate forms no part of the present invention and need not further be described.

In operation of the machine, a roll of dough is discharged from sheeting and curling mechanism generally designated N into the space between the molding drum and the compression plate at one end of the latter as at O, and the roll is rolled in the direction of the arrows and discharged at the other end of the compression plate upon a table P.

In accordance with this invention the compression plate has a padded cover for gradually reducing the diameter of the roll and elongating it as the roll moves between the drum and compression plate. As shown, the padding includes a plurality of superposed strips 1, 2, 3, 4 and 5 of suitable material such as fabric, for example canvas or felt. The strips are of different widths and lengths and are disposed successively in accordance with their widths and with their longitudinal centers coincident. The strips also vary in length, preferably in accordance with variations in their widths, the widest strip being the longest; and preferably the longest and widest strip is at the bottom of the pad while the narrowest and shortest strip is at the top, as clearly shown in Figures 4 and 5. The body of the compression plate comprises a sheet of metal 6, and the pad is secured on the concave side of the body 6 with the thinner end of the pad at the end of the compression plate which initially receives the roll of dough. The strips 1 to 5 have one of their ends spaced successively greater distances from the dough receiving end of the plate 6 and preferably have their other ends coincident at the discharge end of the plate. The pad is faced with a cover 7 which may consist of a single strip of suitable material such as canvas or felt. Preferably the cover is formed of two thicknesses of material, and this may be accomplished and at the same time raw or free edges may be eliminated, by turning the edge portions 8 of the strip inwardly as clearly shown in Figures 3, 4 and 6. The facing cover 7 is applied to the pad with the edge portions 8 in contact with the pad and the facing completely overlies the layers 1 to 5 inclusive so as to present a smooth uninterrupted surface 9 for contact with the dough.

Preferably the plies or thicknesses 1 to 5 inclusive of the pad are secured together by layers of a waterproof or water repellent adhesive between the fabric plies, such as a liquid composition the major portion of which is caoutchouc or raw or unvulcanized rubber, and the thicknesses of the cover 7 are similarly secured together and to the layers 1 to 5. With such a construction the pad and cover are smoothly and securely held on the plate 6 and the moisture from the dough is prevented from soaking through the plies of fabric which in turn reduces possibility of the fabric plies shrinking and rippling or buckling upon drying out of moisture, and maintains the cover and pad in sanitary condition. However, the pad and cover may be secured to the compression plate in any suitable manner.

In operation of the machine so far described, it will be seen that the pad gradually increases in thickness at the longitudinal central portion thereof from the entering end to the discharge end and also gradually increases in thickness from the longitudinal side edges toward the longitudinal center. In other words, the molding drum and compression plate form between them a molding chamber and the space between the periphery of the drum and the compression plate gradually decreases longitudinally of the chamber in the direction of movement of the dough therethrough and from opposite sides toward the longitudinal center of the chamber, and accordingly as a roll of dough which is introduced at the point O is rolled between the compression plate and the drum, the dough is gradually pressed or squeezed from the longitudinal center of the roll toward the ends. With our invention substantially uniform rolling pressure is exerted on the roll of dough throughout its travel between the molding surface of the drum and compression plate, and the dough is gradually worked from the center of the roll outwardly toward the ends, whereby breaking or tearing of the surface or skin of the roll at all points is avoided and the gases in the dough are uniformly distributed throughout the loaf. This action is illustrated in Figures 3 and 4, Figure 3 showing the roll of dough Q at the beginning of the kneading operation and Figure 4 showing the roll at the end of the kneading operation.

The packing or padding on the compression plate may vary in length, width, thickness or number of plies and position on the compression plate, depending upon the type of loaf to be produced, the weight of the roll of dough, the length of the loaf desired and the relation between the length of the sheeting rolls and the above mentioned loaf characteristics.

While we have shown and described the invention as applied to an arcuate compression plate for use in combination with a molding drum, it should be understood that the invention is equally adapted for use with other types of compression plates, for example flat or straight compression plates. Also the details of construction of the compression plate may be modified and changed by those skilled in the art without departing from the spirit or scope of the invention.

Having thus described our invention, what we claim is:

1. In a dough molding machine, the combination of two molding elements having spaced opposed surfaces forming a molding chamber to receive and roll a piece of dough longitudinally of the chamber, the surface of one of said elements gradually approaching the surface of the other element in the direction of movement of the dough and from opposite sides toward the longitudinal center of the chamber for simultaneously influencing the dough from the center of the length of the roll toward the ends and reducing the diameter of the roll.

2. In a dough molding machine, the combination of two spaced opposed molding elements one of which is a compression plate, to receive a piece of dough between them at one end of the compression plate and roll the dough piece to the other end of the plate, said compression plate including a metal body having a padded cover on the side thereof facing the other element, said cover including a plurality of superposed layers of fabric of different lengths and widths disposed so that the surface of the cover gradually approaches the surface of the other element in the direction from the dough receiving end toward the dough discharging end of the compression plate and from the longitudinal sides of the compression plate toward the longitudinal center thereof.

3. In a dough molding machine, the combination of two spaced opposed molding elements one of which is a compression plate, to receive a piece of dough between them at one end of the compression plate and roll the dough piece to the other end of the plate, said compression plate including a metal body having a padded cover on the side thereof facing the other element, said cover including a plurality of superposed layers of fabric of different lengths and widths having one of their ends spaced successively greater distances from the dough receiving end of the compression plate and their side edges spaced successively greater distances from the longitudinal sides of said compression plate.

4. The dough molding machine set forth in claim 3 wherein the other ends of said layers of fabric are coincident with each other.

5. A compression plate for dough molding machines including an elongate body and a padded dough contacting cover on one side of said body which includes a plurality of superposed layers of fabric having one of their ends spaced successively greater distances from one end of the body and their side edges spaced successively greater distances from the longitudinal side edges of the body.

6. A compression plate for dough molding machines including an elongate body and a padded dough contacting cover on one side of said body which includes a plurality of superposed layers of fabric disposed so that the thickness of the cover gradually decreases along the longitudinal center toward one end and toward the opposite longitudinal sides of the body.

7. The compression plate set forth in claim 5 wherein said layers are of the same thickness and are formed of canvas.

8. The compression plate set forth in claim 6 wherein said layers are of the same thickness and formed of canvas.

9. The compression plate set forth in claim 5 wherein said padded cover has a facing layer completely overlying all of said superposed layers.

10. The compression plate set forth in claim 6 wherein said padded cover has a facing layer completely overlying all of said superposed layers.

11. The compression plate set forth in claim 5 wherein said layers are secured to said body and to each other by a waterproof adhesive unvulcanized caoutchouc composition between the layers.

12. The compression plate set forth in claim 5 wherein said padded cover has a facing layer completely overlying all of said superposed layers and said superposed layers are secured to said body and to each other and said facing layer is secured to said superposed layers, by a waterproof adhesive unvulcanized caoutchouc composition between the layers.

13. In a dough molding machine, the combination of two molding elements having spaced opposed surfaces forming a molding chamber to receive and roll a piece of dough longitudinally of the chamber, one of said elements being a compression plate having on its side facing the other element a pad that gradually increases in thickness in the direction of movement of dough between said elements and from opposite longitudinal edges of said plate toward the longitudinal center of the chamber, and a cover on said pad forming a continuous uninterrupted surface, whereby the dough in said roll is gradually influenced from the center of the length of the roll and the roll is simultaneously reduced in diameter throughout its length during its travel over said pad.

EDWARD T. PARSONS.
H. W. SAWYER.